United States Patent [19]

Dutt

[11] Patent Number: 4,743,420
[45] Date of Patent: May 10, 1988

[54] METHOD AND APPARATUS FOR INJECTION MOLDING A THIN-WALLED PLASTIC CAN

[75] Inventor: Herbert V. Dutt, Sarasota, Fla.

[73] Assignee: Sun Coast Plastics, Inc., Sarasota, Fla.

[21] Appl. No.: 907,936

[22] Filed: Sep. 16, 1986

[51] Int. Cl.$^4$ .................. B29C 45/00; B29C 45/36
[52] U.S. Cl. ................... 264/102; 264/328.1; 264/328.12; 425/546; 425/547; 425/556; 425/577
[58] Field of Search ............... 425/542, 437, 556, 546, 425/577, 588, 468, 547; 264/328.12, 101, 102, 328.1, 520, 335

[56] References Cited

U.S. PATENT DOCUMENTS

| | | | |
|---|---|---|---|
| 2,683,899 | 3/1951 | Reichenbach | 249/144 |
| 2,799,435 | 7/1957 | Abplanalp | 264/328.9 |
| 3,008,187 | 1/1959 | Slade | 264/119 |
| 3,159,701 | 12/1960 | Herter | 264/328.12 |
| 3,167,811 | 2/1965 | Kraus et al. | 425/217 |
| 3,374,500 | 3/1968 | Drenning | 425/174.8 E |
| 3,397,266 | 8/1968 | Ayres | 264/328.12 |
| 3,559,581 | 2/1971 | Kriz et al. | 102/467 |
| 3,829,548 | 8/1974 | Edwards | 264/328.12 |
| 3,972,737 | 8/1976 | Sullivan et al. | 425/577 |
| 4,126,291 | 11/1978 | Gilbert et al. | 425/556 |
| 4,479,914 | 10/1984 | Baumrucker | 425/546 |
| 4,520,991 | 6/1985 | Letica | 192/13 A |
| 4,622,002 | 11/1986 | Bormuth | 425/577 |

FOREIGN PATENT DOCUMENTS 192528 10/1984 Japan ..................... 264/322

*Primary Examiner*—Jay H. Woo
*Assistant Examiner*—C. Scott Bushey
*Attorney, Agent, or Firm*—Jones, Tullar & Cooper

[57] ABSTRACT

A mold assembly for producing a container having a closed bottom is disclosed. Inner and outer core members are closely spaced together to provide a cavity for forming a container having a wall thickness on the order of 0.015 inch. The cavity is formed with a plurality of radial flow channels which produce corresponding ribs on the container bottom. The radial channels extend from an axial injection port outwardly to the wall portion of the cavity, where a thickened transition region joins the bottom of the container to the side wall portion thereof. A plurality of vertical flow channels are formed by means of milled flat portions on the surface of the inner core along the length of the side wall. The flow channels cause fluid plastic injected under high pressure to flow radially outwardly, around the bottom corner of the container, and down the vertical flow channels located intermediately of the ends of the ribs. The plastic material flows from the flow channels and then laterally outwardly into the bottom and side walls, thereby permitting a rapid and equallizing distribution of plastic material throughout the cavity. This maintains the inner core member axially located within the outer cavity mold portion of the mold assembly to produce uniform, very thin container walls in a reliable and rapid manner.

18 Claims, 3 Drawing Sheets

METHOD AND APPARATUS FOR INJECTION MOLDING A THIN-WALLED PLASTIC CAN

BACKGROUND OF THE INVENTION

The present invention relates, in general, to the manufacture of thin-walled containers, and more particularly to methods and apparatus for injection molding generally cylindrical containers having wall thicknesses on the order of 0.015 inch.

As pointed out in U.S. Pat. No. 2,683,899, it is well known in the injection molding art that in the mass production of small tubular articles of plastic, it is difficult to accurately control the wall thickness of the article because the plastic material which is injected into the mold at great pressure has a tendency to build up more rapidly at one side of the mold than at the other. This unequal buildup of plastic material can cause the inner, or core portion of the mold to shift or bend slightly with respect to the outer cavity mold, with the result that articles are produced with irregularities in the wall thickness. If the wall of the article is sufficiently thick, such irregularities may be acceptable for some purposes, but when attempts are made to produce thin-walled articles, such irregularities often result in weakness or incomplete formation of the article. The '899 patent attempted to solve this problem of irregular wall thickness by providing positioning lugs within the mold to hold the core in alignment with the cavity mold. U.S. Pat. No. 3,559,581 recognizes the same problem, and suggests as a solution the use of an annular slit through which a liquid polymer plastic is supplied to the mold cavity. The annular slit is said to cause an even distribution of the plastic around the mold. U.S. Pat. No. 3,829,548 also discusses the problem, and proposes as a solution the provision of a projecting pin which is axially aligned with the mold and which serves to lock the mold parts together to prevent relative shifting.

Although the foregoing patents propose various solutions to the production of injection molded thin-walled containers, they are all directed to articles having shapes which can accommodate the use of alignment pins or lugs, and to articles having wall thicknesses which will tolerate some deflection of the core portion of the mold. However, for very thin walled containers such as plastic cans, or other containers wherein the distance from the injection post to the end of the mold cavity is relatively great, the solutions offered by the foregoing patents are not satisfactory, either because they do not provide sufficient stabilization of the inner core, or because they require an alignment structure which cannot be used with a flat bottomed, closed end container.

The present invention is directed to a solution to the problem of producing a plastic container in an injection mold having a long distance between the injection port and the end of the container cavity, wherein the container has extremely thin walls, on the order of 0.015 inch. Such a container typically has a height greater than its diameter, although other configurations are possible, and may be used, for example, for packaging single-strength juices, frozen concentrates, and like food products, where high internal pressures within the container are not encountered. These containers may be used in conjunction with an external sleeve to enhance the burst strength and to provide a convenient surface for product identification. Because these containers do not require a high wall strength they can be produced with very thin side walls to significantly reduce the amount of plastic used. However, when this is done, it is imperative that the spacing between the inner and outer mold elements be maintained substantially uniform throughout the circumference and length of the container during the molding process, since the thinness of the wall does not provide much tolerance for error. But because of this need for uniformity, such articles are extremely difficult to produce in a high speed injection molding process, since the pressures required for injection of the plastic are extremely high, and some movement of the inner core of the mold with respect to the outer cavity mold is to be expected. Such movement will prevent the plastic from flowing uniformly throughout the mold, resulting in an unacceptably high rate of incompletely molded containers or of containers with extremely thin and weakened wall sections. Thus, the techniques previously used for injection molding of high ratio containers are not suitable for producing containers having wall thicknesses less than about 0.020 inch, and have not been capable of producing wall thickness of 0.015 inch thickness or less.

SUMMARY OF THE INVENTION

It is, therefore, an object of the present invention to provide a method and apparatus for making thin-walled containers.

It is a further object of the present invention to provide a method of making high height to diameter ratio containers, and particularly containers of the type known as plastic cans, with wall thicknesses on the order of about 0.015 inch.

It is a still further object of the present invention to provide apparatus for reliably molding high height to diameter ratio containers with wall thicknesses of about 0.015 inch.

Briefly, the present invention relates to a mold construction and to a molding process for the production of thin-walled containers, especially containers having wall thicknesses of 0.015 inch or less. The apparatus and method of the invention permit production of such containers reliably, and with consistent wall thicknesses throughout the circumference and length of the container. The mold assembly of the present invention includes an outer cavity mold and an inner core defining therebetween a cavity for receiving liquid thermoplastic material such as polypropylene, preferably at a temperature of between 450° and 480°. The plastic material is supplied through an injection port and under high pressure, on the order of 25,000 to 30,000 psi, so that the material flows quickly into the cavity while still at a high temperature. The flow of the plastic material into the cavity is enhanced by a vacuum drawn at the end of the cavity opposite to the injection port so that the air to be displaced by the plastic is removed from the cavity together with gases produced by the plastic itself.

Preferably, the liquid plastic material is injected into the mold cavity at its longitudinal axis, and in the region of the cavity which defines the closed bottom of the container, the injection port forming a hub at the center of the container bottom. The outer cavity mold, or the inner core element if desired, defines a plurality of radially-extending flow channels, or runners, which extend from the central hub radially outwardly along the bottom wall portion of the mold cavity to an annular flow channel near the periphery of the cavity. These radially-extending flow channels form upstanding ribs on the bottom wall of the molded container, while the annular flow channel forms an annular support flange on the bottom of the container and on which the container rests after completion. The radially extending flow channels are thicker than the cavity forming the bottom of the container, as is the annular flow channel, and accordingly they serve to distribute the plastic outwardly from the hub and around the circumference of the container cavity rapidly. The rib flow channels are all of the same size in cross section to insure a rapid, radial flow of equal amounts of the liquid plastic material to all parts of the circumference of the container cavity, so that the pressure produced by the plastic material will be applied evenly around the circumference of the inner core to prevent deflection of the core with respect to the mold cavity.

The inner core is formed in two parts, and includes a core base and a core poppet. The poppet forms the top of the core and is movable with respect to the core base to permit air ejection of the container after it has cooled and the plastic has set. The core poppet portion is cylindrical, but has a slightly smaller diameter than the core base to define an annular, thickened mold cavity for part of the wall portion of the container, this thickened portion being on the order of 0.020 inch thick. The thickened wall cavity portion extends from the annular flow channel at the bottom wall of the container around the edge of the container bottom and a short distance along the height of the container cavity. This thickened portion serves as a transition segment of the cavity to insure a smooth and even flow of plastic from the horizontal bottom portion of the container cavity around the corner at the outer circumference of the container cavity to the vertical wall portion and to further insure that the plastic material flows evenly around the circumference of the cavity so as to produce an equalized pressure on the core in this location. It is at the very top of the core, in the region of the poppet, that the greatest bending moment is applied to the core element by the injection of liquid plastic during the molding process, and accordingly the cavity is made sufficiently thick at this point to insure an equalization of the radially directed pressure caused by the injection of plastic into the container cavity. In one form of the invention, the core poppet extends about ¾ of an inch along the vertical wall of the container cavity, or less than about 15% of the standard 5½ inch height of a container for 12 fluid ounces of a beverage.

The core base is generally cylindrical and is spaced from the walls of the outer mold cavity to provide a container wall cavity about 0.015 inch thick. The core base is shaped at its lower end to define, in cooperation with the cavity mold, the shape of the container opening and the rim edge of the container to which a suitable closure is secured. Furthermore, the core base includes a plurality of longitudinal flow channels parallel to the axis of the cavity, extending the length of the core base and spaced between the locations of the radially extending flow channels formed along the bottom wall portion of the cavity. The core channels preferably are on the order of ¼ to ⅜ inch wide and consists of flat surfaces milled into the cylindrical surface of the core base. These flat surfaces produce in the container cavity a plurality of spaced, longitudinally extending feeders for directing liquid plastic along the length of the container cavity, so that the plastic rapidly flows from the thickened wall portion defined by the core poppet down to the bottom of the container cavity. The surfaces of these longitudinal flow channels are spaced at their maximum distance approximately 0.020 inch from the interior surface of the cavity core to insure a fast, even flow of plastic. The feeders produce in the completed container longitudinally extending, slightly thickened flow regions which serve to strengthen the container, but which are primarily for the purpose of distributing the plastic material down the length of the container cavity.

The radially extending flow channels, the annular flow channel, and the thickened lower wall transition region formed by the poppet all cooperate to provide an equalized distribution of liquid plastic around the circumference of the container cavity. The longitudinally extending feeders then direct the plastic along the length of the container cavity so that the liquid plastic reaches the full length of the cavity very rapidly. Continued application of plastic material under pressure during the injection process then forces the plastic material laterally out of the radial flow channels and out of the longitudinal feeders to fill in the remainder of the container cavity. The flow pattern produced by the above-described structure maintains an equalized pressure around the circumference of the inner core, insures a rapid flow of the material into the mold so that it reaches the far end of the cavity before significant cooling occurs, and thereby insures uniform wall thicknesses around the circumference of the container. With the foregoing arrangement, the plastic material can be injected very rapidly, in about of 0.25 seconds, without causing deflection of the mandrel, and insures a reliable production of containers.

The molding apparatus and method described above permits the production of an extremely thin-walled container having numerous advantages over prior plastic can containers, since it is lighter in weight than was possible with prior molds and molding techniques, and provides significant savings of materials. It has been found that in the production of a conventional 12 fluid ounce container, which typically has a diameter of 2½ inches and a height of 5½ inches, the present system utilizes about 12 grams of plastic, whereas a conventionally molded plastic can having similar dimensions but with a wall thickness of 0.020 inch throughout its height requires about 20 grams of material. When manufacturing containers in large quantities, such a difference in material usage is significant.

BRIEF DESCRIPTION OF THE DRAWINGS

The foregoing and additional objects, features and advantages of the present invention will become apparent to those of skill in the art from a consideration of the following detailed description of a preferred embodiment, taken in conjunction with the accompanying drawings, in which.

DESCRIPTION OF PREFERRED EMBODIMENT

Figure 1:
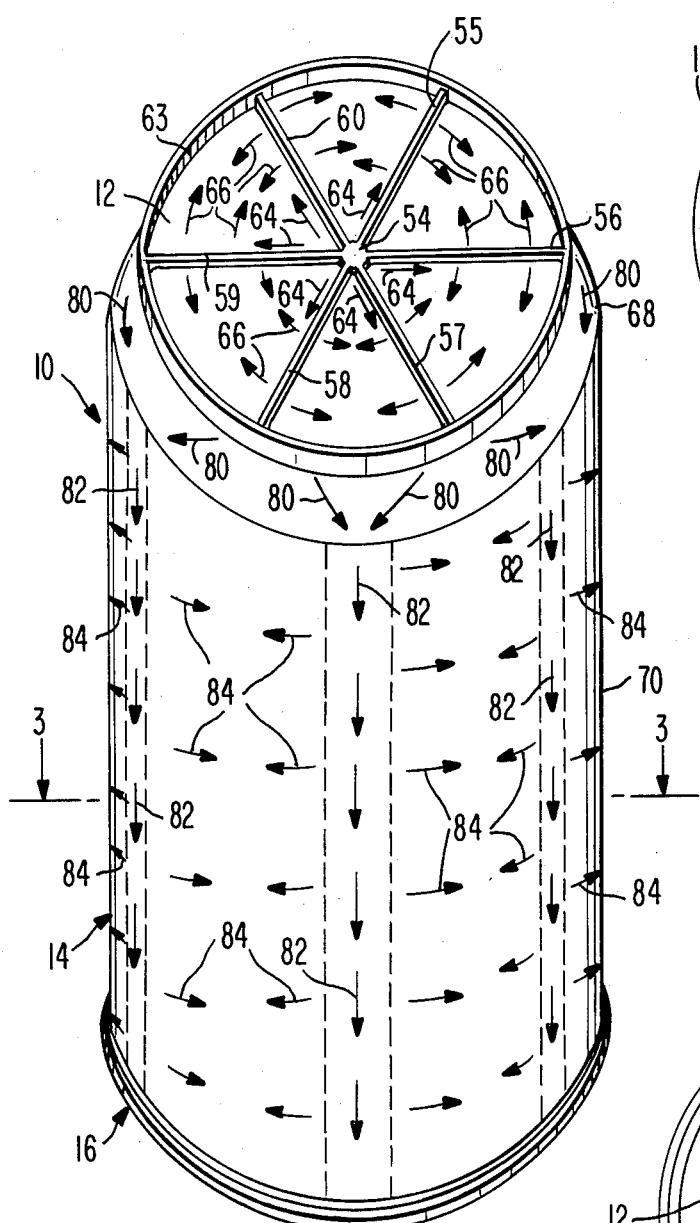
FIG. 1 is a perspective view of an inverted container constructed in accordance with the present invention.

FIG. 1 illustrates a molded article 10, which may be a cylindrical container of the type often referred to as a plastic can. The container 10 has a closed, generally horizontal bottom wall 12, and a vertical, cylindrical side wall 14 which terminates in a top rim 16. The rim defines an open mouth (not shown) which may be closed, if desired, by a suitable lid which engages the rim 16. Such containers are generally formed, by injection molding, from a thermoplastic material such as polypropylene, or the like, and may be formed in a variety of sizes. Commonly, containers of the type herein described are designed to contain approximately 12 fluid ounces, and thus are generally approximately 2½ inches in diameter and about 5½ inches in height, although this may vary. Prior containers of this type necessarily have been formed with a wall thickness in excess of 0.020 inch so as to obtain reliably consistent wall thicknesses and to avoid the problems produced by deflection of the inner core member of an injection molding assembly during high pressure injection molding. The present container is distinct from such prior containers, however, in that it is produced with a wall thickness on the order of 0.015 inch throughout virtually all of its circumference and height, to thereby provide a lighter weight, less expensive container. In accordance with the method described herein, and through the use of the apparatus herein disclosed, the thin-wall container is obtained without the need for centering pins or other support devices for the central core of the mold, but obtains the desired uniformity by controlling the liquid plastic flow within the mold cavity so that the pressure is equalized and the inner core is not forced out of alignment with the outer cavity mold.

Figure 4:
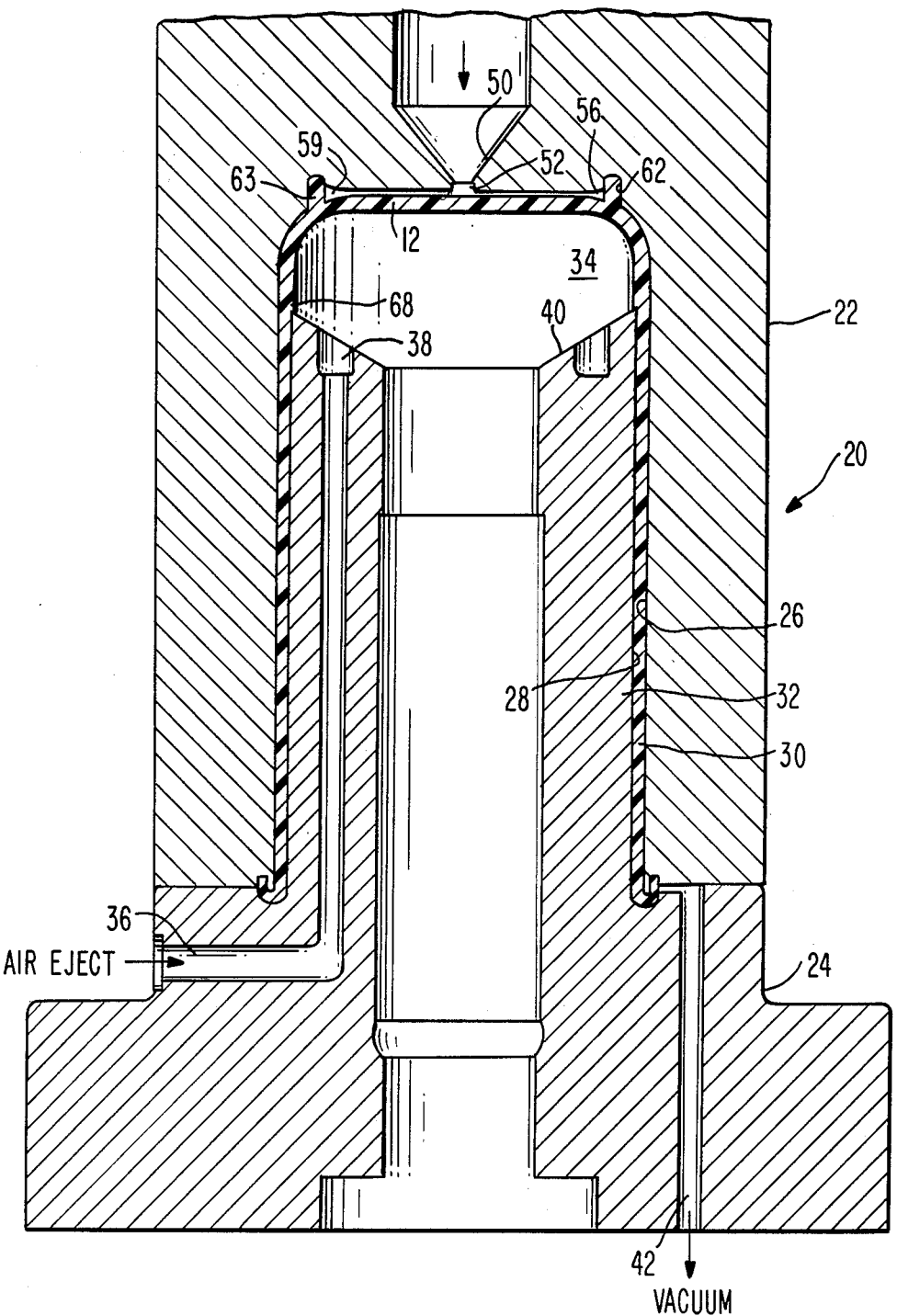
FIG. 4 is a cross sectional view of a mold assembly for producing the container of FIG. 1.

The container of FIG. 1 is formed in a mold assembly 20, illustrated in FIG. 4, which includes an outer cavity mold portion 22 and an inner core mold 24 which extends into the cavity mold 22 in conventional manner. The cavity mold 22 includes an interior cavity surface 26 which cooperates with the outer surface 28 of the core to define a mold cavity 30 which, in the illustration of FIG. 4, is shown as being filled with a plastic material which forms the molded article 10 of FIG. 1. The mold surfaces 26 and 28 are spaced apart to define the thickness and shape of the molded article 10, in conventional manner.

Figure 5:
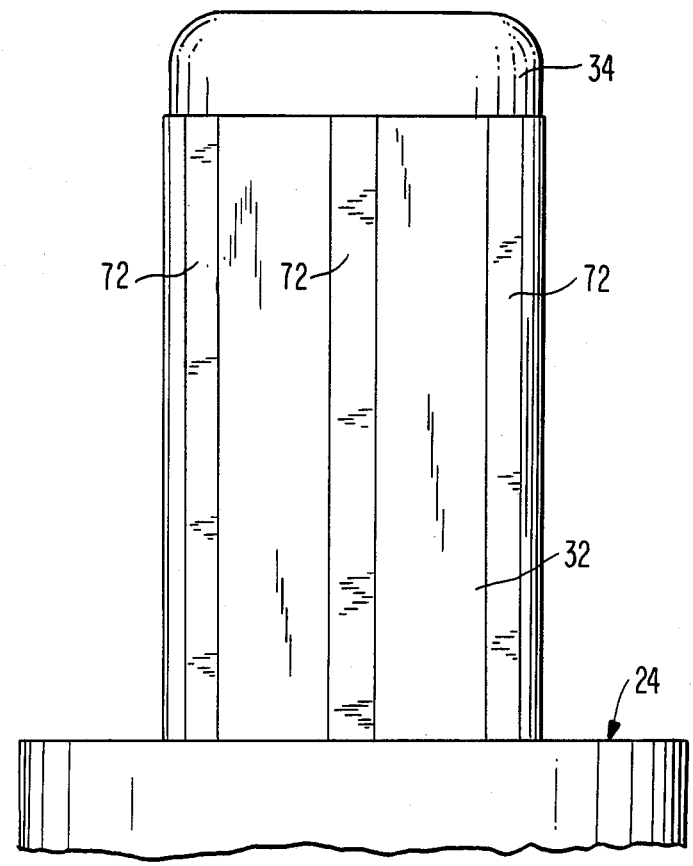
FIG. 5 is a side elevational view of the inner core element of the assembly of FIG. 4.

As illustrated in FIGS. 4 and 5, the core mold 24 includes a core base 32 and a core poppet 34 located at the top end of the core mold 24 and mounted for limited axial motion, on the order of 0.005 inch, with respect to the core base. A pressurized air passage 36 extends through the core base 32 and terminates in an annular air chamber 38 at the interface 40 between the core base and the poppet 34. The air chamber is formed in the base 32 with its upper end being closed by the lower surface of the poppet so that air pressure applied to inlet 36 will tend to raise the poppet slightly with respect to the base 32.

The purpose of the poppet 34 is to permit air ejection of the article 10 after the molding process is complete. This is accomplished by supplying air to inlet 36 under a pressure sufficient to slightly raise the poppet after the high pressure injection of plastic material has been completed. The injection of plastic holds the poppet down against the base, but as soon as that pressure terminates, the poppet is raised by the air pressure by about 0.005 inch to provide a circumferential air slot at the interface 40 around the core mold 24. When the plastic has cooled sufficiently to allow removal of the article from the mold assembly, the cavity mold 22 is moved away from the core mold 24 and air is supplied to inlet 36 under sufficient pressure to eject the article from the core mold.

The base 24 also includes a vacuum passageway 42 which communicates with the cavity 30 at the lower end thereof, as viewed in FIG. 4. During the injection of plastic into the cavity 30, a vacuum of about 20 to 25 inches of mercury is applied to the passageway 42 to facilitate the flow of the plastic material. Although the injection process is possible without such a vacuum, the accumulation of gas from the plastic resin material and the presence of ambient air within the cavity impede the flow of plastic. This slows down the injection process and can cause the plastic to cool and start to set up prematurely, thereby blocking the flow of plastic into some areas of the mold cavity and producing voids in the molded article. The use of a vacuum at the bottom of the mold cavity produces a faster flow, allowing the plastic to stay fluid throughout the injection process and preventing voids from occurring, even in very thin-walled articles.

Figure 3:
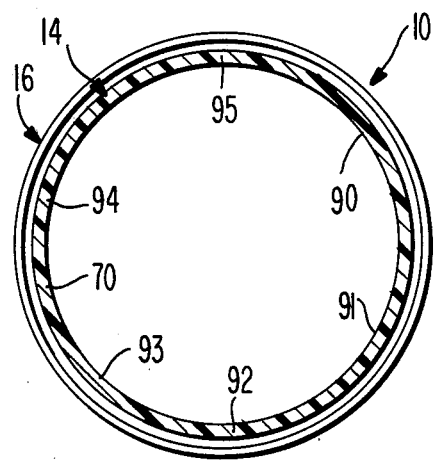
FIG. 3 is a sectional view taken along lines 3—3 of FIG. 1.
Figure 2:
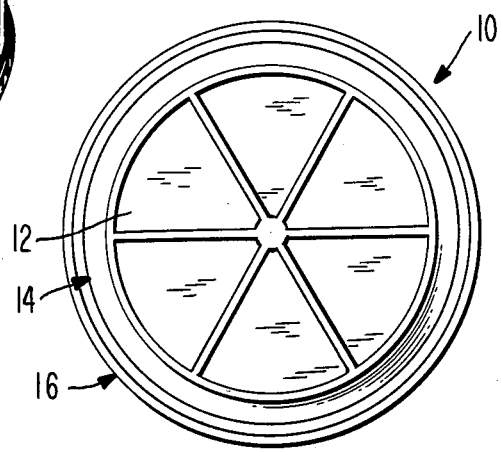
FIG. 2 is a plan view of the bottom of the container of FIG. 1.

The principle feature of the present invention which prevents the formation of voids in the plastic article 10 is the provision of defined flow paths which insure a rapid and even distribution of the injected plastic throughout the mold cavity. These flow paths are illustrated on the container of FIGS. 1, 2 and 3, and in the mold assembly of FIGS. 4 and 5. As illustrated, the cavity mold 22 includes an injection port 50 which receives the fluid plastic material which is to be injected into the cavity 30. The plastic preferably is at a temperature of between 450° and 480° and is supplied to the injection port, for example, by means of a hydraulically or pneumatically operated ram, at pressures of between 25,000 and 30,000 psi. The mold assembly is maintained at a relatively high temperature, as by means of a hot water jacket or hot water passageways (not shown) so that the plastic can flow very rapidly into the cavity 30.

The injection port 50 is aligned with the longitudinal axis of the cavity 30 so that the plastic material is injected at the approximate center of the article, thereby insuring that the flow paths for the plastic material will be approximately the same to the side walls of the cavity so that the plastic material will arrive at the same time at the periphery of the core 24 to insure that the core is not deflected, but remains centered with respect to the cavity mold 22. The injection port 50 communicates with an injection hub 52 formed at the axial center of the cavity mold 22, the cavity hub producing a corresponding container hub 54 in the molded article 10.

The cavity mold 22 is shaped to provide a plurality of radially extending flow channels which form in the bottom wall 12 of the container 10 a set of ribs 55 through 60, illustrated in FIG. 1, leading from the hub 54 to an annular flow channel 62. This channel produces on the article 10 an annular support flange 63 which forms a base for the completed container 10.

The ribs 55–60 provide reinforcement for the bottom wall 12 of the container; however, more importantly, the ribs and the annular support flange serve as feeders, or flow paths for the injected plastic. The ribs are relatively large in cross-section, extending out of the bottom wall 12, and preferably are greater than 0.020 inch in width, as viewed in FIG. 2. Similarly, the support flange 63 is of relatively large cross-section, as compared to the thickness of the bottom wall portion 12, again to provide a low-resistance flow path for the liquid plastic. The bottom wall 12 is substantially flat and generally horizontal as illustrated in FIGS. 1 and 4, and in a preferred form of the invention, is at least 0.020 inch thick so that liquid plastic will readily flow laterally from the rib flow paths into the portions of the bottom wall 12 between the ribs. The flow of plastic from the hub 54 is generally indicated by the arrows 64 as being radially outwardly along the rib flow paths, and from there in lateral paths, as indicated by the arrows 66, into the bottom portion 12 of the container between adjacent ribs. Thus, the plastic initially flows along the ribs to the rim 63 to move the hot plastic quickly outwardly to the wall areas of the article 10 while it is still hot, so as to facilitate the flow of plastic into the wall cavity, and thereafter flows into the thinner bottom wall portion 12 between the ribs.

The annular flow channel 62 also serves as a flow path to direct plastic around the circumference of the container 10, after which the plastic material begins to flow downwardly in the cavity 30 to form the wall portion 14 of the article. The transition of flow from the radially outward direction to the vertically downward direction at the edge of the bottom wall is facilitated by a thickened transition wall portion 68 which is formed in the region of the core poppet 34. This is accomplished by providing a poppet which is of slightly smaller diameter than the core base, so that cavity 30 is thicker (in the radial direction) in the region of the core poppet than in the region of the core base, as may be best seen in FIG. 4. Preferably, the wall thickness in region 68 is about 0.020 inch to thereby insure a low resistance to the flow and further facilitate the even distribution of the plastic material. This even distribution around the poppet 34 equalizes the pressure which is directed radially inwardly by the plastic material to thereby prevent displacement of the core during the injection process.

The plastic material then flows downwardly from the thick walled transition portion 68 of the article 10 into the region of the cavity surrounding the core base 24, where the cavity surfaces 26 and 28 are closer together in order to produce the thin side wall of the container 10 in accordance with the present invention. This thin wall portion of the container is, generally indicated at 70 in FIG. 1, and is approximately 0.015 inch thick. This exceptionally thin wall presents a high resistance to the plastic material flow and produces rapid cooling in the material during the injection, so that the flow is further impeded, thus making it very difficult to obtain a satisfactory molded product.

To facilitate the flow of plastic into the lower wall portion 70, and to maintain the balanced pressure on the core portion of the mold so that it remains centered in the cavity, a plurality of flow channels are provided along the length of the thin wall portion 70. Each flow channel is formed by means of a "flat" 72 which is milled into the surface 28 of the generally cylindrical core base 32. Three of these flats, or core flow channels, are illustrated in FIG. 5, but it will be understood that they are equally spaced around the circumference of the core base 32, again to insure an equal distribution of the plastic completely around the core. The core flow channels 72 are positioned between the radial flow channels on the cavity mold 22, so that the initial flow path of the injected plastic material from the flange 63 is through the transition wall portion 68 toward the vertical flow channels 72, in the manner illustrated by arrows 80 in FIG. 1, and then down the flow channels in the manner indicated by the vertical arrows 82. When the initial flow of plastic material reaches the bottom of the mold, continued injection pressure causes the material to begin to flow laterally outwardly from the flow channels into the intermediate portions of the wall 70, as illustrated by the arrows 84.

In accordance with the foregoing flow patterns, therefore, injected plastic moves through the hub area 52, radially outwardly through the radial channels which form ribs 55 to 60 in the direction of arrows 64, circumferentially around the support flange 63 and at the same time outwardly and downwardly around the bottom edge of the container cavity in the region of the wall portion 68, and then into the vertical wall cavity and particularly into the vertical flow channels 72, as illustrated by the arrows 80 and 82. The plastic flows down the flow channels 72 to the bottom of the cavity 30 and also laterally into the region of the wall cavity between the flow channels, as illustrated by arrows 84. This flow pattern insures a rapid flow of plastic material into the spaced flow channels around the central core to insure that the pressure against the core is equalized around its circumference to prevent it from shifting with respect to the cavity mold 22 and to insure that the high temperature plastic moves to the bottom of the mold cavity as quickly as possible so that it will flow more evenly into the thin wall sections while it is still relatively hot. This flow pattern, together with the high pressure of the injection and the vacuum drawn in the cavity 30 insures a rapid filling of the cavity, with the resulting distribution of plastic material, through balanced feeding of the material throughout the cavity, maintaining the wall thickness constant completely around the container, except in the area of the flow channels, to produce a very thin-walled container.

In a preferred form of the invention, six radially extending flow channels, are provided, with six vertical flow channels being spaced between the ends of the radial channels. The vertical flow channels produce corresponding thickened portions, or runners, spaced around the thin wall 70 of the resulting article, as illustrated at 90 through 95 in FIG. 3. It will be understood that these runners 90–95 are shown with an exaggerated thickness for purposes of illustration, but that in fact they need be only about $\frac{1}{8}$–$\frac{3}{8}$ inch wide so as to provide a maximum radial thickness of about 0.020 inch at their thickest portion. This slight flattening of selected areas of the surface of the core base 32 and the resulting small increase in thickness of the wall in the runners produced by the limited flow channels has been found to greatly increase the reliability of the molding process and to enable injection molding of high ratio containers with wall thicknesses much smaller than has previously been possible.

Although the present invention has been described in terms of a preferred embodiment, it will be apparent that variations and modifications may be made without departing from the true spirit and scope thereof as set forth in the accompanying claims

What is claimed is:

1. The method of producing injection molded articles having a relatively long flow path, comprising:
   forming a mold cavity having a bottom wall portion, a very thin side wall portion, and a transition wall portion between the bottom and side wall portions;

forming in the region of the bottom wall portion of the mold cavity a plurality of radial flow channels extending from a central injection hub radially outwardly to said transition wall region;

forming in the region of the side wall portion of the mold cavity and between the outer ends of each pair of adjacent radial channels a longitudinal flow channel extending from said transition wall region to the end of said cavity opposite to the location of said injection hub;

causing fluid thermoplastic material to flow from said injection hub at a high pressure, said material initially flowing radially outwardly along said radial flow channels, through said transition wall region and along said longitudinal flow channels, said initial flow providing a balanced pressure around the circumference of said mold cavity to stabilize the mold; and causing said thermoplastic material thereafter to flow laterally from said radial flow channels into said bottom wall and transition wall portions of said cavity and to flow laterally from said longitudinal flow channels into said thin side wall portion of said cavity, whereby a thin-walled container is formed in said cavity.

2. The method of claim 1, further including drawing a vacuum in said cavity to facilitate the flow of said thermoplastic material.

3. The method of claim 1, further including forming an annular flow channel at the periphery of said bottom wall portion to produce a circumferential distribution of said thermoplastic material.

4. The method of claim 1, further including supplying said thermoplastic material at a high temperature, whereby said material remains fluid during its injection into said cavity.

5. A separable mold assembly for injection molding containers having a closed bottom end and a thin side wall, comprising:

an outer cavity mold;

an inner core mold concentric with said outer mold and spaced therefrom to form a cavity for receiving thermoplastic material in a fluid state and under pressure, said cavity having a bottom wall portion, a side wall portion, and an intermediate transition wall portion between said bottom and side wall portions;

injection port means for supplying said thermoplastic material to said cavity, said port means being coaxial with said cavity;

a plurality of radial flow channel means in one of said inner and outer molds and extending radially from said port means to said transition wall portion;

a plurality of longitudinal flow channel means formed on said inner core mold and extending from said transition wall portion along the length of said inner core mold;

said radial flow channel means providing increased thickness regions in said end wall portion and said longitudinal flow channel means providing increased thickness regions in said side wall portion to cause injected thermoplastic material to flow initially along said flow channels and thereafter to flow laterally from said channels into said wall portions of said cavity, said radial flow channels producing upstanding ribs in the bottom wall of a container produced in said cavity, and said longitudinal flow channels producing parallel, spaced runners along the length of the side wall of a container produced in said cavity, said runners being only slightly thicker than said side wall.

6. The assembly of claim 5, further including an annular flow channel formed in said outer cavity mold adjacent the edge of said bottom wall portion, said annular flow channel producing a support flange on the bottom wall of a container formed in said cavity.

7. The assembly of claim 5, wherein said cavity is shaped to produce a generally cylindrical container having a high height to diameter ratio.

8. The assembly of claim 5, wherein said radial flow channels are formed in said cavity mold.

9. The assembly of claim 5, wherein each of said longitudinal flow channel means comprises a flat surface formed along the length of said inner core mold in the region of said cavity side wall portion, said flat surfaces forming runners in the side wall of a container and wherein the runners are slightly thicker than the side wall.

10. The assembly of claim 5, wherein said each of said plurality of longitudinal flow channel means is located between the outer ends of a pair of adjacent radial flow channel means.

11. The assembly of claim 5, further including vacuum means connected to said cavity at an end of the cavity opposite to the location of said injection port.

12. The assembly of claim 5, further including air ejection means in said inner core mold for ejecting a completed container from said core mold.

13. The assembly of claim 5, wherein said bottom wall portion and said transition wall portion of said cavity have a thickness in excess of 0.020 inch, and wherein said side wall portion of said cavity has a thickness of about 0.015 inch.

14. The assembly of claim 5, wherein said radially extending channels are balanced to direct equal amounts of injected plastic to spaced locations around the transition wall area at the same time, whereby said inner core is stabilized.

15. A separable mold assembly for injecting molding containers having a closed end and a thin side wall, comprising:

an outer cavity mold;

an inner core mold concentric with said outer mold and spaced therefrom to form a cavity for receiving thermoplastic material in a fluid state and under pressure, said cavity having an end wall portion, a side wall portion, and an intermediate transition wall portion between said end and side wall portions;

injection port means in the region of said end wall portion for supplying said thermoplastic material to said cavity, said port means being coaxial with said cavity;

a plurality of radial flow channel means in said end wall portion of said cavity, said radial channel means being formed in one of said inner and outer molds and extending radially from the region of said port means to said transition wall portion;

a plurality of longitudinal flow channel mean formed in said side wall portion of said cavity, said longitudinal channel means being formed on said inner core mold and extending from said transition wall portion of said cavity along the length of said inner core mold;

said radial flow channel means providing increased thickness regions in said end wall portion and said longitudinal flow channel means providing increased thickness regions in said side wall portion to cause injected thermoplastic material to flow initially along said flow channels and thereafter to flow laterally from said channels into said end and side wall portions of said cavity, said radial flow channels producing upstanding ribs in the bottom wall of a container produced in said cavity, and said longitudinal flow channels producing parallel, spaced runners along the length of the side wall of a container produced in said cavity, said runners being only slightly thicker than said side wall, said flow channel means maintaining a uniform spacing between said inner core mold and said outer cavity mold during high pressure injection of plastic into said cavity.

16. The assembly of claim 15, wherein said transition wall portion comprises an annular region at the intersection of said end and side wall portions of said cavity for producing a transition side wall portion of greater thickness than the remainder of said side wall portion.

17. The assembly of claim 16, wherein said radial and longitudinal flow channels intersect said intermediate transition wall portion, the intersection locations of said radial flow channels being offset from the intersection locations of said longitudinal flow channels.

18. The assembly of claim 17, wherein the intersection location of said longitudinal flow channels are intermediate the intersection locations of said radial channels.

* * * * *